United States Patent [19]

Breitigam et al.

[11] Patent Number: 5,098,496
[45] Date of Patent: Mar. 24, 1992

[54] METHOD OF MAKING POSTFORMABLE FIBER REINFORCED COMPOSITE ARTICLES

[75] Inventors: Walter V. Breitigam; Wilbur P. Ubrich, both of Katy; Gary A. Hunter; Georg G. Viola, both of Houston, all of Tex.

[73] Assignee: Shell Oil Company, Houston, Tex.

[21] Appl. No.: 213,412

[22] Filed: Jun. 30, 1988

[51] Int. Cl.⁵ .......................... B29D 9/00; B29C 43/30
[52] U.S. Cl. ............................... 156/180; 156/199; 264/40.6; 264/40.7; 264/134; 264/137; 264/145; 264/171; 264/236; 264/237; 264/257; 264/294; 264/295; 264/297.5
[58] Field of Search ............ 264/135, 136, 137, 40.7, 264/40.6, 134, 145, 171, 236, 237, 257, 258, 294, 295, 297.5, 347, 348; 156/180, 181, 441, 182, 196, 199, 228, 238, 242, 256, 263, 269

[56] References Cited

U.S. PATENT DOCUMENTS

| | | | |
|---|---|---|---|
| 3,244,784 | 4/1966 | Boggs | 264/137 |
| 3,859,243 | 1/1975 | Blasing, Jr. | 528/254 |
| 4,002,790 | 1/1977 | Trewiler | 428/212 |
| 4,044,185 | 8/1977 | McCaskey, Jr. et al. | 428/153 |
| 4,249,980 | 2/1981 | Shobert | 425/155 |
| 4,285,749 | 8/1981 | Stiles | 264/137 |
| 4,296,060 | 10/1981 | Killmeyer et al. | 264/137 |
| 4,305,770 | 12/1981 | Stiles | 264/137 |
| 4,329,306 | 5/1982 | Crivello | 264/137 |
| 4,376,748 | 3/1983 | Van Erven | 264/255 |
| 4,419,400 | 12/1983 | Hindersinn | 428/245 |
| 4,469,541 | 9/1984 | Goldsworthy | 264/258 |
| 4,483,904 | 11/1984 | Church | 428/543 |
| 4,605,527 | 8/1986 | Kamura et al. | 264/137 |
| 4,780,166 | 10/1988 | Hunter | 264/137 |
| 4,804,509 | 2/1989 | Angell | 264/280 |

*Primary Examiner*—Jay H. Woo
*Assistant Examiner*—Jeremiah F. Durkin

[57] ABSTRACT

A process for preparing a postformable composite article of a heat curable thermosetting polymer having a substantial length and a non-trivial uniform cross-sectional shape. The process includes controlling the pull rate and the temperature of the heating and cooling sections of the die in response to the viscosity and the cure kinetics of the thermosetting polymer composition and (2) the non-trivial shape of the article.

39 Claims, 2 Drawing Sheets

METHOD OF MAKING POSTFORMABLE FIBER REINFORCED COMPOSITE ARTICLES

FIELD OF THE INVENTION

The present invention relates to postformable fiber reinforced shaped composite articles, their preparation and their use in preparing postformed, shaped composite articles.

BACKGROUND OF THE INVENTION

A variety of techniques are used to prepare various kinds of shaped fiber reinforced composite articles of thermoplastic and thermosetting polymers. For example, U.S. Pat. No. 3,244,784 discloses a process for preparing fiber reinforced resin articles of fully cured polyester resin. Such articles have a non-trivial shape but since they are fully cured, they cannot be further formed. U.S. Pat. No. 4,296,060 discloses a process of pultruing fiber reinforced rods in which the partially cured rod is immediately twisted online. U.S. Pat. No. 4,329,306 discloses a processable epoxy composition for use in filament winding or pultrusion. In pultrusion example 11 of this patent, the epoxy resin exits the die in a fully cured state so it cannot be further formed. U.S. Pat. No. 4,419,400 discloses pultruded reinforced phenolic products which are trivial shaped filaments. U.S. Pat. No. 4,483,904 discloses a method of forming a fiber reinforced body by destroying the strength and adhesion of the resin in a fiber reinforced rod to allow the fibers to burst apart, splaying the fibers and then treating the fibers with a setting liquid to form a newly shaped structure. U.S. Pat. No. 4,605,527 discloses a process for producing a clutch facing which comprises coating an inorganic fiber with a thermosetting resin, coating the resin with rubber-organic fiber sheets and molding the preform under heat and pressure to form an integral sheet.

Conventional pre-pregable fiber reinforced thermosetting resin articles having non-trivial shapes have been prepared by forming thin sheets of fiber reinforced thermosetting resin in which the resin was partially cured. When non-trivially shaped articles were desired, the thin sheets have been cut into a desired form, stacked to a desired thickness and then formed under thermosetting conditions to complete the cure of the resin and to form an integrated article of the desired non-trivial shape and form. Such a process (1) requires many pieces of different and complex equipment, (2) is not a continuous forming operation so it is difficult to have resins which will remain partially cured while they are being passed through the many manipulative steps required to obtain the article having a non-trivial shape and (3) is time-consuming.

SUMMARY OF THE INVENTION

The present invention is directed to a continuous process for preparing a postformable article of a fiber reinforced thermosetting polymer composition, said article having a substantial length and a non-trivial uniform cross-sectional shape conforming with the cross-sectional shape of an article having a edge portion of considerable width as compared to its thickness, which process comprises introducing reinforcing fibers continuously into a heat hardenable liquid thermosetting polymerizable composition;

pulling the polymer composition-fiber mixture continuously through a die having a conforming channel of the desired non-trivial cross-sectional shape;

controlling the pull rate and the temperature of the die to gel the polymer composition during the pulling through the die so that the article will retain its non-trivial cross-sectional shape for an extended period of time, said controlling being in response to (1) the viscosity and the cure kinetics of the thermosetting polymer composition and (2) the non-trivial shape of the article; and recovering a postformable article of a fiber reinforced polymer composition from the die., said article having a substantial length and a non-trivial uniform cross-sectional shape, and said polymer composition being sufficiently gelled and cooled to retain its non-trivial cross-sectional shape for an extended period of time until it is subsequently formed and cured into a slightly different shape.

The process of the present invention provides a direct and continuous means of preparing postformable fiber reinforced thermosetting composite articles of heat curable thermosetting polymerizable materials in forms other than flat sheets.

The product composite articles produced by the process of the present invention are those having a "near net shape" and a non-trivial uniform cross-sectional shape conforming with the cross-sectional shape of an article having an edge portion of considerable width as compared to its thickness throughout its length. This excludes a simple thin, flat sheet. The term does include angular or tubular cross-sections, such as circular tubes and rods or non-circular objects, such as square, circular, rectangular, trapezoidal, X-shaped, T-shaped, J-shaped, I-shaped, trilobal, dog bone-shaped, angle-shaped, or other regular or irregular shape.

The pultrusion die has a conforming channel of the desired non-trivial cross-sectional shape. The length of the channel can be varied depending on the degree of temperature control to be applied and pull rate for a given thermosetting polymerizable composition and shape of the non-trivial cross-sectional shape of fiber reinforced article to be produced therefrom. Auxiliary energy (heat) devices can be used as needed to assist with temperature control outside (preceding) entry of the mixture into the die.

The temperature is controlled during the pulling of the polymer composition-fiber mixture through the die to provide first the amount of heat to heat the die and polymer compositon-fiber mixture passing through it, needed to gel the thermosetting polymerizable composition to obtain a postformable article of a fiber reinforced polymer composition, having a non-trivial cross-sectional shape, and second to provide the subsequent amount of cooling to the die to cool the polymer composition-fiber mixture passing through it to retard further immediate curing of the polymer composition for an extended period of time, such that the article will retain a shape when taken off-line for hours, days, weeks, months or years.

In one embodiment of the invention, the temperature of the polymerizable composition is also further controlled by preheating to maintain it in a non-solid state, e.g., for the fiber coating procedure, or to bring the polymer composition up to or, preferably just below, the curing temperature at the point where the polymer composition-fiber mixture enters the die.

Any thermosetting polymerizable composition can be used to form the composite articles of the present invention which will provide the degree of tackiness and extended postformability compatible with the heat carried out under alkaline reaction conditions. The liquid epoxy resin products obtained when the hydroxyl group-containing compound is bisphenol-A are represented below ing and forming techniques used to fabricate postformable composite parts by the process of the invention. Suitable thermosetting polymerizable compounds include conventional addition polymerizable compositions, such as epoxy, benzocyclobutene, acetylene, cyanate, polyimide, and bismaleimide compositions known in the art to be heat curable to a gel state and that can be controlled by the temperature of the environment such that the compositions will remain postformable for "an extended period of time". By extended period of time is meant that the postformable article remains sufficiently gelled and of the desired fixed non-trivial cross-sectional shape under non-thermal conditions for more than immediate processing. In other words, the polymer composition will remain in the gelled shape off-line for hours, days, weeks, months or even years, if desired. The desired gel state is conventionally a B-staged form of the thermosetting polymer when the material has an infinite viscosity point but loses its fluidity. The B-staged material may or may not have a "tacky" surface.

As a practical matter, one of skill in the art can select and formulate thermosetting polymerizable compositions useful in various applications of the present process and products thereof. There will, of course, be variation in choice of ingredients by those of skill in the art taking into consideration that the thermosetting polymerizable composition should have a relatively low room temperature viscosity, long working times, adjustable curing in terms of either advancement or conversion, reasonable pull rates and pull forces compatible with the various fiber reinforcement that are available and long windows of postformability (shelf life) at reasonable (non-thermal) storage temperatures.

Suitable resin compositions for us in the method of the present invention include those compositions containing conventional thermosetting polymerizable compounds of the types previously described. Such compounds can contain other reactive monomers as herein later described.

When the thermosetting polymerizable resin composition is an epoxy resin composition it can contain a liquid epoxy resins having a relatively low room temperature viscosity. By relatively low room temperature viscosity is meant a viscosity of from about 50 to about 2000 centistokes and, preferably, from about 100 to about 1000 centistokes.

The liquid epoxy resin component of the invention composition can be any curable liquid epoxy resin having, on the average, more than one vicinal epoxide group per molecule. The liquid epoxy resin can be saturated or unsaturated, aliphatic, cycloaliphatic, aromatic or heterocyclic, and may bear substituents which do not materially interfere with the curing reaction. They may be monomeric or polymeric.

Suitable liquid epoxy resins include glycidyl ethers prepared by the reaction of epichlorohydrin with a compound containing at least one hydroxyl group carried out under alkaline reaction conditions. The liquid epoxy resin products obtained when the hydroxyl group-containing compound is bisphenol-A are represented below wherein n is zero or a number greater than 0, commonly in the range of 0 to 10, preferably in the range of 0 to 2. Other suitable liquid epoxy resins can be prepared by the reaction of epichlorohydrin with a polyhydric phenol, including mononuclear di- and trihydroxy phenolic compounds such as resorcinol and phloroglucinol, selected polynuclear polyhydroxy phenolic compounds such as bis(p-hydroxyphenyl)methane and 4,4'-dihydroxybiphenyl, or aliphatic polyols such as 1,4-butanediol and glycerol. Suitable liquid epoxy resins are also disclosed in U.S. Pat. Nos. 2,633,458 and 4,366,108, the disclosures of which are incorporated herein by references.

Liquid epoxy resins suitable for the invention compositions have molecular weights generally within the range of 100 to about 10,000, preferably about 200 to about 1500. The commercially available liquid epoxy resin EPON ® Resin 828, a reaction product of epichlorohydrin and 2,2-bis(4-hydroxyphenyl)propane (bisphenol-A also known as BPA) having a molecular weight of about 400, an epoxide equivalent (ASTM D-1652) of about 185-192, and an n value in the formula above of about 0.2 or EPON ® Resin 825, an essentially pure diepoxide of BPA having a slightly lower molecular weight than EPON ® 828, are presently the preferred liquid epoxy resin because of their low viscosity and commercial availability. The amount of liquid epoxy resin in the polymerizable composition will vary depending on the kind and amount of ingredients and can be determined by those of skill in the art. By way of example, the liquid epoxy resin will preferably be present in the resin composition in an amount of from about 75 to about 97 weight percent, about 85 to about 95 weight percent, based on the weight of the total resin composition.

Any conventional epoxy curing agent can be used which will achieve the desired properties in the polymerizable composition. Suitable curing agents include a variety of known aromatic primary amines curing agents. Alkyl hindered primary aromatic diamines are one kind of particularly suitable aromatic primary amine curing agents. The alkyl hindered primary aromatic diamine curing agents (a) are liquid or low melting solids and are much easier to incorporate into an epoxide resin than conventional aromatic polyamines. The alkyl hindered aromatic primary diamines useful in this invention include sterically hindered aromatic diamines containing two primary amine groups and at least two aromatic ring. The two primary amine groups are attached directly to non-adjacent carbon atoms in the aromatic nucleus. At least one position ortho to each amine group contains an alkyl substituent having one to three carbon atoms. Preferred hindered amines are those wherein no more than one position ortho to each amine group contains a hydrogen atom or alkyl substituent. Particularly preferred alkyl hindered amines are those wherein at least 3 of the positions ortho to the amine groups contain an alkyl substituents. These alkyl hindered aromatic diamines can be mononuclear or dinuclear, trinuclear or higher in which at least one primary amine group is attached to each end group aromatic nucleus. Examples of such alkyl hindered aromatic diamines are methylenebis(2,6-diisopropylaniline), methylenebis(2,6-diethylaniline), methylenebis(2-methyl-6 -ethylaniline) and the like. The preferred alkyl hindered aromatic diamine is EPON HPT TM Curing Agent 1062, alpha, alpha'-bis(3,5-dimethyl-4-aminophenyl)-p-diisopropyllbenzene.

Any liquid aromatic primary amine can also be used as the curing agent. Preferably, such other liquid aromatic primary amines (b) include a diamine such as methylenedianiline 2,4-bis(p-aminobenzyl)aniline, or is a second but liquid hindered aromatic amine, such as diethyltoluenediamine (a mixture of 1-methyl-3,5-diethyl-2,4-diaminobenzene and 1-methyl-3,5-diethyl-2,6-diaminobenzene), alone or with about 20% weight of a reactive monomer described later, such as an acrylate or methacrylate ester of a polyol, trimethylolpropane trimethacrylate.

The total amount of (amine) curing agents, e.g., amines (a) and/or (b) is sufficient to cure the composition considering the other kinds and types of ingredients present and can readily be determined by those of skill in the art. For example, the amount can be from about 0.5 to about 2.0 chemical equivalents of(amine) curing agent to epoxy resin (one amino hydrogen per epoxy group).

Although not required in all epoxy polymerizable compositions, any conventional amine curing accelerator can also be used and is present in a amount effective to increase the rate of cure of the epoxy resins. Use of the accelerator allows the composition to be relatively low in viscosity prior to application of heat. Upon short-term heating the accelerator promotes sufficient cross-linking such that, as the mass is cooled to room temperature, it will form a non-tacky solid. The curing agent is relatively latent, and will build in preppreggability by increasing the inherent viscosity of the total resin system.

Particularly suitable amine cure accelerators include the triakylsulfonium salts containing anions of low nucleophilicity are preferred. Suitable tri(-hydrocarbyl)-sulfonium salts have the following general formula:

wherein $R_1$, and $R_2$, and $R_3$ each represent the same or differently alkyl or aryl radicals of from about 1 to about 18 carbon atoms; and X is selected from the group: $BF_4$, $PF_6$, $AsF_6$, $SbF_6$, $CF_3SO_3$, 2,4,6-trinitrobenzenesulfonate, p-toluenesulfonate, etc. The alkyl or aryl radicals $R_1$, $R_2$ and $R_3$ may contain various substituents such as oxygen, sulfur, halogens, etc.

Suitable triorgano-sulfonium salts include, among others, triethylsulfonium tetrafluoroborate, methyldiphenylsulfonium tetrafluoroborate, ethyldipheylsulfonium tetrafluoroborate, allyldimethylsulfonium tetrafluoroborate, allyl bis(2-(allyloxy)ethyl)sulfonium tetrafluoroborate, trimethylsulfonium hexafluorophosphate, ethyl(2-hydroxyethyl)(2-ethylthio)ethyl)sulfonium tetraflouroborate, 2-ethylthio)ethylsulfonium tetraflouroborate.

In general, a catalytic amount of triorgano-sulfonium salts are used, i.e. 0.001% to about 10% by weight of the polyepoxide, preferably about 0.3% to about 5% by weight.

The amount of amine cure accelerator which is present can vary widely but will generally be within the range of about 0.50 to about 2.0 equivalents of amine to epoxy resin, preferably from about 0.75 to about 1.25 equivalent of amine for each equivalent of epoxy resin, although this can vary depending of the curing agent and the condition of the cure.

The invention composition further contains at least one reactive monomer. Any conventional reactive monomer can be used including vinyl aromatic monomers, esters of ethylenically unsaturated carboxylic acids, amides of ethylenically unsaturated carboxylic acids, polyacrylate esters of polyols, polymethacrylate esters of polyols, cyano-containing compounds, vinyl esters, vinyl amides and allyl-containing compounds, and preferably, a low molecular weight ethylenically unsaturated momomer having a molecular weight of less than about 325. The reactive monomer is generally an aliphatic or aromatic monomer having at least one site of vinyl unsaturation. Examples of unsaturated aromatic monomers include, for example, styrene, α-methyl styrene, p-methyl styrene, halo- and nitrosubstituted styrenes, such as vinyl toluene, chlorostyrene, bromostyrene, nitrostyrene, divinylbenzene, tert-butylstyrene, 2-vinylpyridine, and vinylnaphthalene. Styrene is the preferred vinyl aromatic monomer.

The reactive monomer can be an ester or amide of an ethylenically unsaturated carboxylic acid such as acrylic acid, methacrylic acid, crotonic acid, α-phenylacrylic acid, α-cyclohexylacrylic acid, maleic acid, cyanoacrylic acid and methoxyacrylic acid. Examples of esters of these include methyl methacrylate, ethyl acrylate, butyl acrylate, butyl methacrylate, isobutyl methacrylate, 2,3-dibromopropyl acrylate and pentachlorophenyl methacrylate.

Also included in the reactive monomers are polyacrylate and polymethacrylate esters of polyols containing more than one terminal acrylate or methacrylate group, such as acrylates and methacrylates of alkylene glycols, polyoxyalkylene glycols, alicyclic glycols, and higher glycols, such as, for example, ethylene glycol, triethylene glycol, tetraethylene glycol, tetramethylene glycol, hexanediol, trimethylolethane, trimethylolpropane and pentaerythritol. Typical such unsaturated monomers include trimethylolpropane triacrylate, trimethylolethane triacrylate, trimethylolpropane trimethacrylate, trimethylolethane trimethacrylate, tetramethylene glycol dimethacrylate, ethylene glycol dimethacrylate, triethylene glycol dimethacrylate and 1,6-hexanediol diacrylate. Preferred esters are neopentyl glycol dimethacrylate, trimethylolpropane trimethacrylate, trimethylolpropane triacrylate, pentaerythritol triacrylate and 1,3-butylene dimethacrylate.

Examples of unsaturated carboxylic acid amides include acrylamide, N,N'-dimethylacrylamide, diacetone acrylamide, N-isopropylacrylamide and N,N'-dimethyl methacrylamide.

The reactive monomer can be a cyano-containing compound such as acrylonitrile, methacrylonitrile and halogenated acrylonitriles.

The reactive monomer can be a vinyl ester or amide such as vinyl acetate, vinyl benzoate, divinyl adipate, N-vinylpyrrolidone, N-vinylacetamide and N,N-divinyladipamide.

The reactive monomer can be an allyl-containing monomer such as diallyl phthalate, triallyl isocyanurate, diallyl isophthalate, allyl diglycol carbonate, diallyl ether of bisphenol A, diallyl ether of resorcinol an the like.

The reactive monomer can also be a mixture of one or more of the above monomers. A mixture of a vinyl aromatic monomer, such as styrene, and a multifunctional methacrylate, such as trimethylolpropane trimethacrylate (TMPTMA), is preferred. In some cases, the additional reactive monomer(s) are added as an admixture with the amine (a) or (b).

The total reactive monomer will generally be present in the composition in an amount effective to reduce the viscosity of the composition to the desired level. Generally, the reactive monomer diluent will be present in an amount of about 0.5 to about 35 weight percent, preferably about 5 to about 10 weight percent, based on the weight of the total composition.

A peroxide free radical polymerization initiator is present in an amount effective to crosslink the reactive monomer. Examples of such initiators include benzoyl peroxide, tert-butyl hydroperoxide, ditert-butyl peroxide, hydrogen peroxide, potassium persulfate, methyl cyclohexyl peroxide, cumene hydroperoxide, acetyl benzoyl peroxide, dicumyl peroxide, 2,5-bis(tert-butyl-peroxy)-2,5-dimethylhexane and the like. The peroxide is preferably an aliphatic peroxide and especially 2,5-bis(tert-butylperoxy)-2,5-dimethylhexane. The amount of the peroxide free radical initiator can vary over a wide range depending upon the type and amount of vinyl monomer present and the type of initiator and desired end properties. In general terms, the amount of the peroxide free radical initiator will, for most purposes, fall within the range of about 0.001 to about 10 weight percent, preferably about 0.01 to about 5 weight percent, based on the weight of the total composition.

The monomers will usually contain an amount of a polymerization inhibitor effective to prevent premature polymerization of the monomer, generally less than about 0.5 weight percent, usually less than about 0.2 weight percent, based on the weight of the reactive monomer.

Conventional heat volatile, inert solvents can be used in the thermosetting polymerizable composition, if desired. Suitable solvents include halogenated hydrocarbons, ketones and the like, including methylene chloride, acetone, and the like.

The thermosetting polymer compositions of the invention can contain a variety of additives to impart specific properties and processing characteristics to the composition provided that they do not impair the essential properties of the resulting thermosetting polymer composition. Examples of such additive including natural or synthetic resins, fillers, pigments, dyestuffs, thickening agents, lubricants, flame-retardants, mold release, air release and the like. For example, the thermosetting polymer compositions of this invention can contain a white pigment, such as titanium dioxide, a colored pigment, such as yellow lead, carbon black, iron black, molybdenum red, prussian blue, ultramarine, cadmium yellow or cadmium red, and various other organic dyes and pigments in order to color the compositions. The compositions can contain a rust-proofing pigment, such as zinc chromate, red lead, red iron oxide, zinc flower or stontium chromate, an anti-sag agent, such as aluminum sterate, a dispersing agent, a thickener, a coat modifier, a body pigment, smoke retardant, uv stabilizers, electrical property modifiers, mold release agents, plasticizers, heat stabilizers, or a fire retardant and the like.

As herein used "reinforcing fibers" includes filaments, yarn, roving mats, felt, ribbon, tape, fabric and the like in continuous or chopped form, usually aligned parallel to the flow of material and including stitched or braided fibers. Use of a plurality of continuous, parallel, reinforced fiber threads is preferred. The number and arrangement of the fibers used in the process of the invention will vary according to the particular nontrivial cross-sectional shape of the article being formed and can readily be determined by a person of skill in the art of pultrusion. Usually, the fiber used is conveniently from about 25 to 80 weight percent based on the total mixture.

The fibrous reinforcing material can be any conventional material suitable for reinforcing means, including metal pieces, wood, glass fibers, carbon fibers (graphite), boron fibers, ceramic fibers, KEVLAR fibers, synthetic organic fibers (e.g., polyamides and the like) and the various other inorganic or organic fibrous materials known to be useful for reinforcing thermosetting polymer compositions, such as cellulose, asbestos, cotton, and metal. Suitable fiber reinforcing materials are glass fiber.

The thermosetting polymerizable composition can be applied to the reinforcing fibers in a variety of ways, such as by dip coating in a bath, spraying the polymerizable coating onto the reinforcing fibers, application by roll coating and the like. Preferably, the thermosetting polymerizable resin compositon is applied by passing the fibers through a bath, which can be heated to an elevated temperature to maintain the composition liquid and/or by external application of heat up to the curing temperature or, preferably, just below to control the temperature of the resin in the mixture fed to the die. Other means of preheating include application of radio frequency, torpedo heaters, uv radiation or the like to heat the polymer composition-fiber mixture before it enters the die to an elevated temperature up, but preferably, to just below, the curing temperature of the thermosetting polymerizable composition to control the temperature of the mixture to the die. Excess polymer composition is preferably removed from the fibers by brushing or combing means or the like. These can also serve as preforming guides or such guides can be provided separately to align the coated fibers in the coating process and/or prior to their entry into the die.

The shaped, fiber reinforced polymer composition is pulled through the die at the desired pull rate using caterpillar rollers, belts, clamps, or the like. The rate of pull being adjusted to the length of the die channel, the degree of temperature control required to gel a given thermosetting polymerizable composition and the nontrivial cross-sectional shape of the article being produced.

The die or forming device is selected according to the desired shape of the postformable article to be prepared. The selection of the die and the materials from which it is prepared are readily selected by one of skill in the pultrusion art. As is well known, the surfaces should be smooth to the flow of the fibers and polymer composition and it can be desirable to coat the die with suitable non-metallic coatings, such as polytetrafluoroethylene or the like.

The heating of the forming die is usually throughout the length of the conforming channel. The end of the conforming channel being the point at which the polymerizable composition has reached a gelled state so that the fiber reinforced polymerizable composition can retain its non-trivial cross-sectional shape. The heating is usually applied in a gradient manner throughout the length of the conforming channel. The highest temperatures are usually applied near the far end of the channel from the entrance with lower heat applied at near the entrance and from the early to the mid parts of the channel so that the polymerizable composition used in forming the article heats evenly throughout the cross-sectional shape thereof.

The present invention also includes a continuous process for the preparation of a postformable article of a fiber reinforced thermosetting polymer composition, said article having a substantial length and a non-trivial uniform cross-sectional shape with an edge portion of considerable width as compared to its thickness, which process comprises introducing reinforced fibers continuously into a heat hardenable liquid polymerizable composition;

pulling the polymer composition-fiber mixture continuously through a die, said die having the desired non-trivial cross-sectional shape and at least one heating section and a cooling section;

controlling the pull rate and the temperature of the heating and cooling sections and of the die to gel the polymer composition during the pulling through the die so that the article will retain its non-trivial cross-sectional shape for an extended period of time, said controlling being in response to (1) the viscosity and cure kinetics of the polymerizable composition and (2) the non-trivial uniform cross-sectional shape of the article;

recovering a postformable article of a fiber reinforced polymer composition from the die, said article having the desired non-trivial uniform cross-sectional shape and substantial length, said polymer being sufficiently gelled to retain its non-trivial cross-sectional shape and sufficiently cool to retard further curing of the polymer composition for an extended period.

The invention also includes an apparatus for use in a continuous process for preparing a postformable article of a fiber reinforced thermosetting polymer composition, said article having a substantial length and a non-trivial uniform cross-sectional shape conforming with the cross-sectional shape of an article having an edge portion of considerable width as compared to its thickness, which apparatus comprises means for introducing reinforcing fibers continuously into a heat hardenable liquid thermosetting polymerizable coating composition;

means for pulling the polymer composition-fiber mixture continuously through a die of the desired non-trivial cross-sectional shape;

means for controlling the pull rate and the temperature of the die to gel the polymer composition during the pulling though the die so that the article will retain its non-trivial cross-sectional shape, said controlling being in response to (1) the viscosity and the cure kinetics of the polymer composition and (2) the non-trivial cross-sectional shape of the article; and means for recovering a postformable article of a fiber reinforced thermosetting polymer from said die; said article having a substantial length and a non-trivial uniform cross-sectional shape, and said polymer composition being sufficiently gelled and cool so that the article will retain its non-trivial cross-sectional shape of an extended period of time until it is subsequently formed and cured into a slightly different shape.

The invention further includes an apparatus for use in a continuous process for the preparation of a postformable article of a fiber reinforced thermosetting polymer, said article having a substantial length and a non-trivial uniform cross-sectional shape conforming with the cross-sectional shape of an article having an edge portion of considerable width as compared to its thickness, which apparatus comprises means for introducing reinforced fibers continuously into a heat hardenable liquid thermosetting polymerizable coating composition;

means for pulling the polymer composition-fiber composite continuously through the die, said die having the desired non-trivial cross-sectional shape and at least one heating section and a cooling section;

means for controlling the pull rate and the temperature of the heating and cooling sections of the die to gel the polymer composition during the pulling through the die so that the article will retain its non-trivial cross-sectional shape for an extended period of time, said controlling being in response to (1) the viscosity and cure kinetics of the polymerizable composition and (2) the desired non-trivial uniform cross-sectional shape of the article;

means for recovering a postformable article of a fiber reinforced polymer composition from the die, said article having a substantial length and non-trivial uniform cross-sectional shape, and said polymer composition being sufficiently gelled so that the article will retain its non-trivial cross-sectional shape and sufficiently cool to retard further curing of the polymer composition for an extended period of time.

The term "continuous" as applied to the process of the invention is intended to include those processes wherein the feed is interrupted or is intermittent but where the methods and apparatus nevertheless are employed to prepare postformable articles or pieces of a fiber reinforced thermosetting polymer composition having a substantial length as to be regarded in the art as being of continuous or infinite length and is not intended to apply to piecemeal formation of individual articles.

The invention also includes a postformable article of a fiber reinforced thermosetting polymer composition, said article having a substantial length and a non-trivial uniform cross-sectional shape, which is prepared by a process which comprises introducing reinforced fibers continuously into a heat hardenable liquid thermosetting polymerizable coating composition;

pulling the polymer composition-fiber mixture continuously through the die, said die having the desired non-trivial cross-sectional shape and at least one heating section and a cooling section;

controlling the pull rate and the temperature of the heating and cooling sections of the die to gel the polymer composition during the pulling through the die so that the article will retain its non-trivial cross-sectional shape for an extended period of time, said controlling being in response to (1) the viscosity and cure kinetics of the polymerizable composition and (2) the desire non-trivial uniform cross-sectional shape of the article;

recovering a postformable article of a fiber reinforced polymer composition from the die, said article having a substantial length and a non-trivial uniform cross-sectional shape, and said polymer composition being sufficiently gelled so that the article will retain its non-trivial cross-sectional shape and sufficiently cool to retard further curing of the polymer composition for an extended period of time.

Eventually the postformable article will be subjected to pressure (force) for a further shaping or deforming, which is usually a non-linear shape, such as a curve, twist (or turning), taper, indentation, protrusion, grooving, lipped or the like. This is slight or substantial postforming depending on the pliability of the postformable article and the final shape desired. Heat is applied to raise the temperature of the postformed, shaped article to a temperature at which complete and final cure of the polymer composition takes place and the new, different shape, e.g.,twist, taper or the like, permanently maintained. The shaping or deforming can be conducted using any conventional means for shaping or deforming a pliable article, including a spring mold, compression mold, autoclave. Heat is usually applied by placing the article in a preheated shaping or deforming means which is maintained at the temperature at which complete and final cur takes place. This temperature depends on the particular (epoxy resin) polymer composition used to prepare the postformable article and is readily determinable by one of skill in the resin art. Pressure (force) and heat can be applied to the postformable article simultaneously or with heat after pressure.

During the shaping and/or heating to full cure in the postforming operation, the article can be adhesively bonded and co-cured or the like to another existing substrate, e.g., composite, metal, foam or other substrate, or to one or more similar postformed articles to form a plank or the like.

The invention also includes a process for preparing a postformed, shaped article of a fiber reinforced thermosetting polymer composition, said article having a substantial length and a non-trivial uniform cross-sectional shape conforming with the cross-sectional shape of an article having an edge portion of considerable width as compared to its thickness, which process comprises introducing reinforcing fibers continuously into a heat hardenable liquid thermosetting polymerizable composition;

pulling the polymer composition-fiber mixture continuously through a die of the desired non-trivial cross-sectional shape;

controlling the pull rate and the temperature of the die to gel the polymer composition during the pulling through the die so that the article will retain its non-trivial cross-sectional shape, said controlling being in response to (1) the viscosity and the cure kinetics of the polymer composition and (2) the non-trivial shape of the article;

recovering a postformable article of the fiber reinforced polymer composition from the die , said article having a substantial length and non-trivial uniform cross-sectional shape, and said polymer composition being sufficiently gelled so that the article will retain its non-trivial cross-sectional shape for an extended period of time until it is subsequently formed and cured into a slightly different shape;

maintaining the postformable article for an extended period at a temperature below the temperature at which further curing of the polymer composition will occur;

cutting the postformable article into a finite length at some time between the time just prior to recovery and prior to postforming;

postforming the postformable article into a different shape;

heating the article to a temperature at which final and full curing of the polymer composition occurs;

and recovering a postformed, shaped article of a fiber reinforced cured polymer composition having a finite length, a non-trivial uniform cross-sectional shape and a different postformed shape. The shaping and heating can be conducted simultneously or with heat as a separate subsequent step.

By determining the pultrusion speed $V_z$ for die length z, the die temperature is determined as a function of distance and the boundary conditions of the internal die temperature values along the article surface, the die temperature in terms of time , i.e., how long it takes the article to traverse a certain distance through the pultrusion die, can be calculated.

Typically one proceeds to (1) determine the initial temperature, $T_1$, of the fiber-polymerizable composition mixture used to make the article at first temperature probe location in the pultrusion die and the degree of conversion of the polymerizable composition, alpha, (2) determine the reaction rate to gel of polymerizable composition d alpha/d time, (3) determine the temperature, $T_2$, at a second temperature probe location in the pultrusion die, (4) determine the increment of time, (5) calculate the distance drawn through the die from the first location to the second location, $V_z$ x time, and, based on the above, (6) set a new die temperature at a probe location based o the distance of the probe from the first or second probe location. For example, the equations below are sufficient to describe the heat transfer and reaction which takes place during the passage of the polymer composition-fiber mixture through the die. For a cylindrical rod a one-dimensional calculation is exact. Such a one-dimensional analysis is practical for a rectangular article where thickness is the most important part. Multi-dimensional calculations can be preferably for the more irregularly shaped articles.

$$pCP \frac{dT}{d\text{time}} = \frac{kd^2T}{dX^2} + (1 - Xg) \cdot \Delta Hrxn \cdot \frac{d\alpha}{d\text{time}} \quad (1)$$

$$\frac{d\alpha}{d\text{time}} = Ae^{(-E/RT)} \cdot (1 - \alpha)^{XN} \cdot (1 - XK\phi \cdot \alpha) \quad (2)$$

where:
$p$ = Resin/fiber composite density
$Cp$ = Resin/fiber composite heat capacity
$k$ = Resin/fiber composite thermal conductivity
$Xg$ = Volume fraction of fiber in system
$\Delta Hrxn$ = Heat of reaction $\frac{d\alpha}{d\text{time}}$ = Reaction rate ($\alpha$ = degree of conversion)

$T$ = Temperature
$t$ = Time
$A$ = Arrhenius constant
$E$ = Activation energy
$XN$ = Power law index
$XK\phi$ = Self-acceleration constant In a similar manner the pull rate is controlled by (1) determining the initial temperature, $T_1$, of the fiber-polymerizable composition mixture used to make the article at a first temperature probe location in the pultrusion die and the degree of conversion of the polymerizable composition, alpha/d time, (3) determining the temperature, $T_2$, at a second probe location in the pultrusion die, (4) determining the increment of time, (5) calculating the distance the fiber-polymerized composition mixture is drawn through the die from the first location to the second location, Vz x time, and, based on the foregoing, (6) set a new pull rate based on the temperatures and degree of conversion of the mixture from the first or second probe location.

This procedure allows for the preparation of a postformable article from any thermosetting polymerizable composition. Moreover, it is possible to use the above procedure to predict the necessary operating conditions to prepare a postformable article from a thermosetting polymerizable composition. Further, by application of an optimization program, the procedure can determine the optimal pultrusion die speed and die temperature profiles to produce almost any two-dimensional cross-sectional postformable article of a thermosetting polymerizable composition.

DETAILED DESCRIPTION OF THE INVENTION

Figure 1:
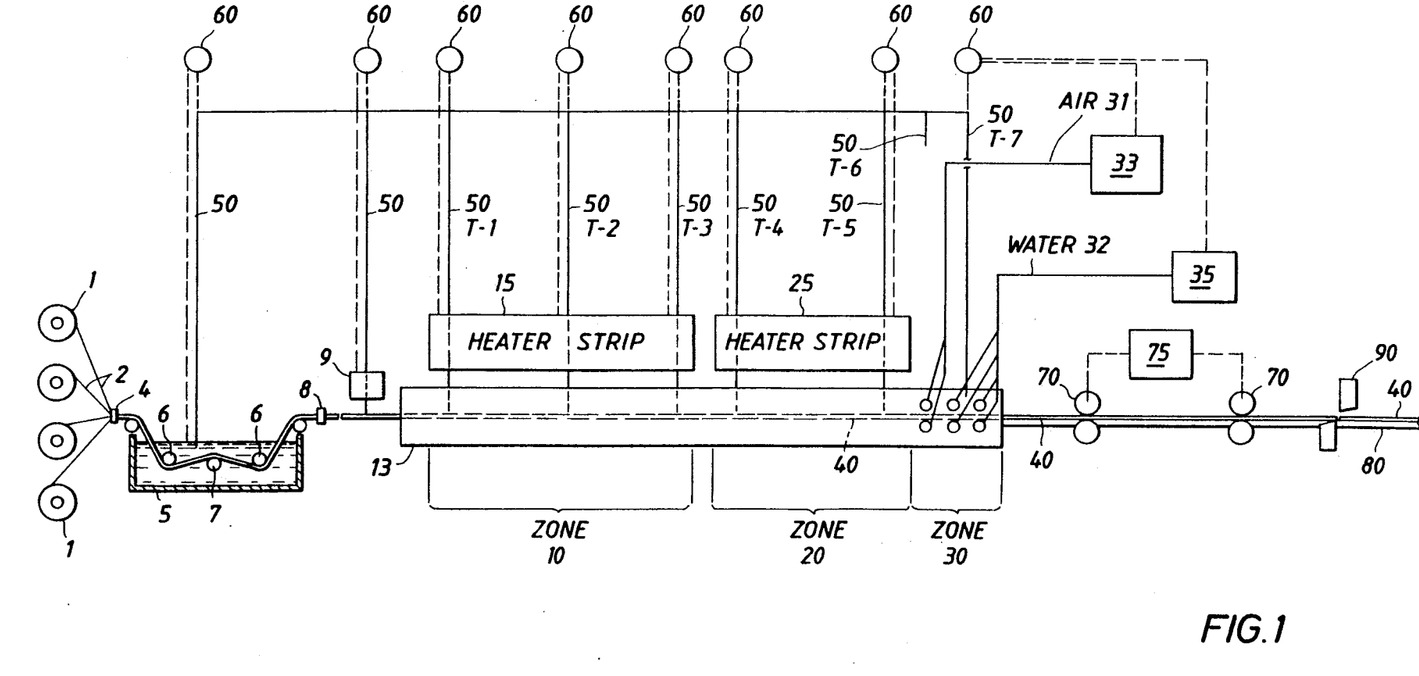
FIG. 1 and 2 are schematic drawing of an apparatus for use in a process for preparing the post-formable articles of the present invention.

With reference to FIG. 1, a plurality of strands of continuous fibers 2, e.g., glass fibers, are introduced from spools 1 into an impregnating bath 5 containing a liquid heat curable thermosetting epoxy resin composition, e.g., EPON® Resin 9405/EPON Curing Agent® 9470, a bisphenol A/epichlorohydrin epoxy resin and liquid aromatic amine based mixture, plus a minor amount of a mold release agent, such as Axel Mold Wiz INT-1846. The impregnating bath usually contains a plurality of guides, e.g., 6 and 7, to provide thorough impregnation of each fiber with the liquid heat curable thermosetting resin composition. Device 4 can be provided to maintain the fibers separate and device 8 to separate fibers and/or remove excess resin by brushing or combing or the like. The coated fibers are continuously pulled through the bath 5 and pultrusion die 13 by a plurality of pulling means 70, e.g., pairs of rollers, driven by hand or mechanical means, as a belt or chain operated by drive and control device 75. The die can be, e.g., a 28-inch long pultrusion die 13 which fabricates a ⅛-inch thick reactangular bar 1-inch wide. The die 13 has heating zones 10 and 20 and a cooling zone 30. The temperatures of the die and the polymerizable composition-fiber mixture in the heating zones are controlled based on a determination of the cure kinetics for the viscosity of the heat curable epoxy resin composition being used. In pultrusion, the resin composition-fiber mixture is heated in the die causing the resin composition to react and being to polymerize. As the resin reacts to form a gel, further heat is liberated from the mixture. Thus, simultaneous heat transfer and reaction occur. If desired, the polymer composition-fiber mixture can be preheated to an elevated temperature up to but, preferably, just below the curing temperature of the resin, e.g., by a torpedo heater, applicaton of uv radiation or radio frequency device 9 or preheating in a heated impregnation bath 5.

The means of heating zones 10 and 20 can be by any conventional means 15 and 25 known in the art to provide controllable direct o indirect heat to heat thermosetting polymerizable compositions to their gel point, including electrical bar heaters, microwave heaters, infrared heaters, quartz heaters and the like. Likewise, the means of cooling 31 and 32 in cooling zone 30 can be supplied by any conventional means known in the art to provide controllable cold to directly or indirectly cool the die and cool the thermosetting polymerizable composition to a temperature below which further curing will not take place, including indirect air cooler means 33, indirect water cooler means 35 and the like.

Thermocouples 50 or other temperature sensing mechanisms are initially used to determine the temperature of the article being produced as it runs from the bath through the die. The thermocouples are placed at various internal points of the cross-section of the die and preferably also of the polymer composition-fiber mixture, including near the surface and near the center of the cross-section of the fiber reinforced mixture, and the external surface of the inside of the die. The thermocouples produce strip charts which reveal the internal temperatures of the reinforced mixture and the actual surface boundary temperature conditions the composite sees as it traverses the die over time. Rheostats 60 or other means are used, usually in coordination with the thermocouple monitoring, to control the temperature of the article being produced as it runs from the bath through the various corresponding heating and cooling zones. These are adjusted manually or by a computer or other processor (not shown) to provide the desired temperature in response to the viscosity and cure kinetics of the epoxy resin composition and the non-trivial uniform cross-sectional shape of the fiber reinforced thermosetting polymer composition article 40 being produced.

It is desirable to control the temperature of the polymer composition-fiber mixture and the die so the article being produced is solidified evenly throughout the article. The reaction rate of cure of the polymer is determined by d alpha d/time. The increment of time is determined as well as the distance down the die Vz x time. These readings are used to calculate the new die temperatures at any one of the specific points in a heating or cooling section based on the distance the article has travelled through the die and cured over time. After an initial trial run of the pultrusion equipment with a particular fiber-polymer composition mixture, the temperatures to be used at any one of the specific points throughout the die can be determined or calculated based on the temperature strip charts and other data as hereinbefore described. The die temperatures can then be adjusted manually or by automatic processing equipment.

The pull rate of the die can be adjusted manually or by automatic processing equipment as determined or calculated based on the temperatures and other data as hereinbefore described.

The postformable article is recovered from the die surface 80 by exiting the pulling devises 70. For convenience, the article is usually cut into finite lengths by cutting devise 90. This finite length can be the ultimate length of the eventually postformed article or a convenient storage and/or transport length. The postformable article of substantial o finite length is then maintained off-line at a temperature below the temperature at which further cure of the (epoxy resin) polymer composition will take place for an extended period of from hours to years until it is desired to postform the article.

Figure 2:
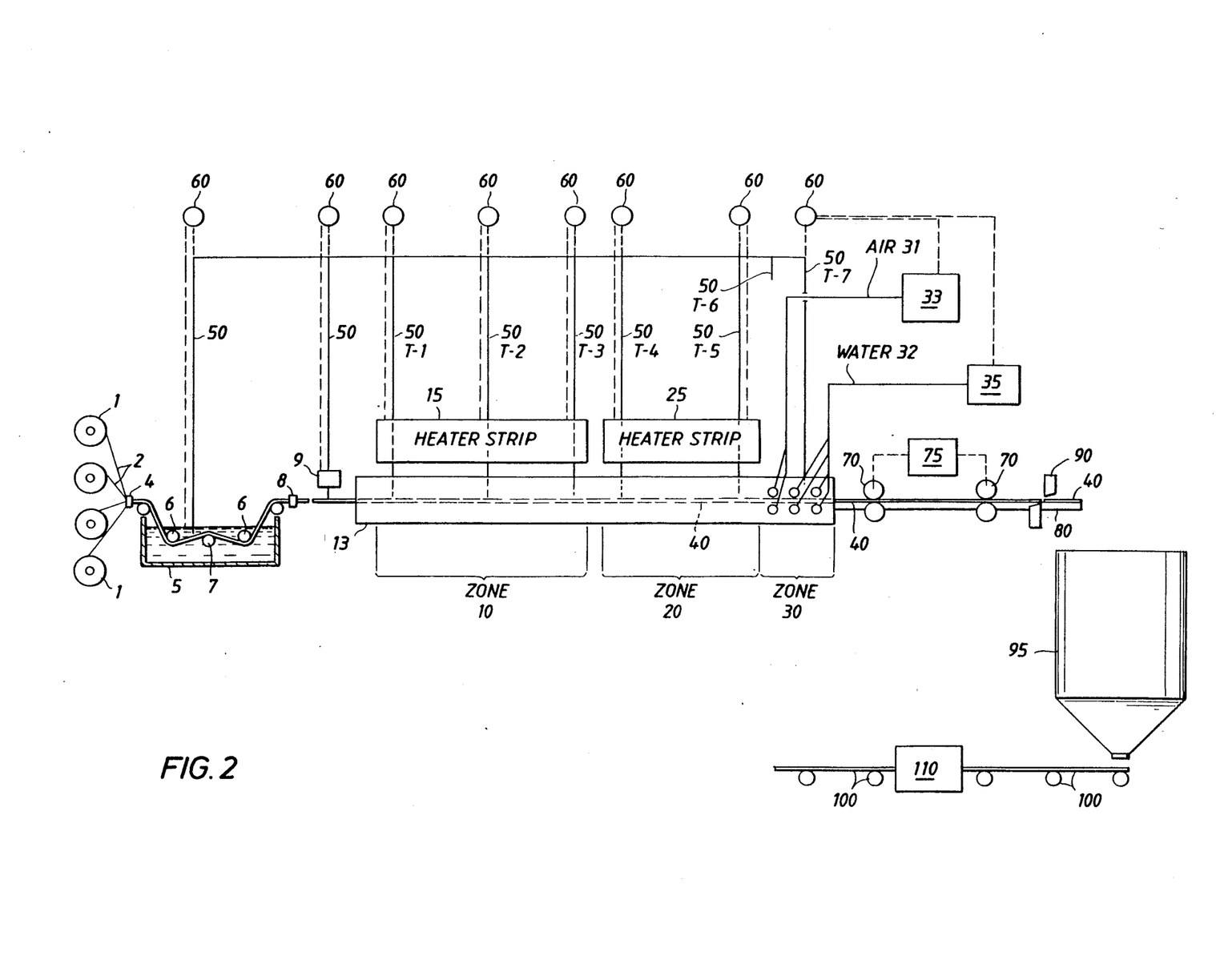

With reference to FIG. 2, a postformable fiber reinforced article of a thermosetting polymerizable composition is prepared using the same composition and same apparatus elements 1-90 along the lines described with reference to FIG. 1. After cutting, the postformable article is removed from the surface 80 and maintained at a temperature below the temperature at which further curing of the addition polymer composition will occur. This is conveniently done manually or by having the finite pieces of the postformable articles drop off the conveyor into a substantially constant temperature holding means, e.g., storage hopper 95 maintained at the desired temperature. The finite pieces of the postformable articles will be maintained at the desired non-cure temperature for hours to years in storage or transit to another manufacturing location. When it is desired to postform one or more of the finite pieces of the postformable articles, the desired number of pieces are removed from the constant temperature means 95 either manually or by having the articles deposited automatically onto a conveyor 100. A finite piece of the postformable article is inserted into forming device 110 where it is formed by application of pressure into a lightly different shape, such as by curving, bending, tapering or the like. The postformed article having a new shape is heated in the forming device or subsequent to its release from the forming device to a temperature at which full and final cure of the thermosetting polymer composition will occur. During the shaping and/or heating to full curing the postforming operations in forming evice 110, the postformable article can be adhesively bonded or co-cured or the like to another existing substrate, such as a composite, metal, foam or other substrate. The cured postformed article is recovered usually by means of conveyor 100.

ILLUSTRATIVE EMBODIMENTS

The following embodiments are included to illustrate the invention and should not be regarded as limiting it in any way.

Embodiment 1

A thermosetting polymerizable composition comprising 100 phr (parts per 100 parts resin) of commercial epoxy resin EPON® Resin 9405 and 28 phr of EPON CURING AGENT® 9740, a bisphenol A/epichlorohydrin epoxy resin and liquid aromatic amine based mixture and 0.5% of a commercial mold release agent AXEL MOLD WIZ INT-1846 was used to impregnate a plurality of commercial glass fibers of PPG Hybon 2079-112. The fiber-polymerizable composition mixture was passed through preforming guides, brushing means and then through a 28" pultrusion die having a non-trivial uniform cross-sectional shape of $\frac{1}{8}"\times 1"$. The pull rate was 8 inches per minute. Temperature probes were used to monitor the temperature $T_1$, $T_2$, and $T_3$ of the die. These probes were located $2\frac{5}{8}$, $6\frac{5}{8}$ and 11 inches from the entrance to the die to monitor temperatures in the first heating zone 10. temperature probes $T_4$ and $T_5$ were located at $15\frac{3}{4}$ and $22\frac{1}{4}$ inches from the entrance to the die to monitor the temperature in the second heating zone 20. A final two temperature probes were used, to monitor the room temperature $T_6$ and in the cooling zone 30 $T_7$. Pultrusion runs were made at various pull rate profiles and various temperature profiles (T-1 through T-7) as set forth in Table 1 below.

TABLE 1

Pultrusion Runs
Product: $\frac{1}{8}" \times 1"$ Plaques

| | SAMPLE ID NO. | | |
|---|---|---|---|
| | 364-107-29 | 364-107-35 | 364-107-50 |
| FORMULATION: | | | |
| Resin System 9405 (PHR) | 100 | 100 | 100 |
| AXEL INT-1846 (%) | 0.5 | 0.5 | 0.5 |
| Curing Agent 9470 (PHR) | 28 | 28 | 28 |
| GEL TIME: | | | |
| @150 C. (min) | 35 | 35 | 35 |
| @180 C. (min) | 15 | 15 | 15 |
| REINFORCEMENT: | | | |
| Glass PPG Hybon 2079-112 Number of Ends | | | |
| DIE PROFILE: | | | |
| Speed (in/min) | 8 | 8 | 8 |
| Load (lb) | 505 | 506 | 512 |
| T-1 (C.) | 91 | 92 | 85 |
| T-2 (C.) | 138 | 139 | 129 |
| T-3 (C.) Control | 178 | 178 | 168 |
| T-4 (C.) | 214 | 210 | 206 |
| T-5 (C.) Control | 187 | 182 | 182 |
| T-6 (C.) Room Temperature | 24 | 24 | 24 |
| T-7 Chiller Temp. (C.) | 30 | 30 | 30 |
| SHORT BEAM SHEAR: | | | |
| RT (KSI) | 10.71 | 9.87 | 8.86 |
| 300 F. (KSI) | 3.42 | 3.08 | 3.12 |
| % Retention @ 300 F. | 32 | 31 | 35 |
| TG: | | | |
| Tg by Dynamic Mechanical Spectroscopy | 161 | 171 | 161 |
| FLEXURAL: | | | |
| ROOM TEMPERATURE: | | | |
| Tangent Modulus (PSI) | 6.58E + 06 | 6.58E + 06 | 6.48E + 06 |
| Yield Stress (PSI) | 1.55E + 05 | 1.57E + 05 | 1.49E + 05 |
| Elongation (%) | 2.9 | 2.9 | 2.8 |

Postformable articles in the form of plaques from the above pultrusion were stored in a freezer at $-7°$ C. overnight. The plaques were removed from the freezer and allowed to warm from $\frac{1}{2}$ to 13 hours at room temperature before being placed in a preheated press for final shaping and curing under the following 5-stage cure schedule shown in Table 2 below which imparted a curved shape to the final article.

TABLE 2

| | Cure Schedule | | | |
|---|---|---|---|---|
| Stage | Temp. °C. | Temp. °F. | PSI | Time |
| 1 | 25 | 77 | 5 | 5 mins. |
| 2 | 120 | 248 | 5 | 1 hr. |
| 3 | 150 | 302 | 50 | 1 hr. |
| 4 | 177 | 350 | 85 | 2 hrs. |
| 5 | 18 | 64 | 85 | 2 mins. |

What is claimed is:

1. A process for preparing an article of a fiber reinforced thermosetting polymer, said article having a substantial length and a non-trivial uniform cross-sectional shape conforming with the cross-sectional shape of an article having an edge portion of considerable width as compared to its thickness, which process comprises introducing reinforcing fibers continuously into a heat hardenable liquid thermosetting polymerizable composition;

pulling the polymer composition-fiber mixture continuously through a die, said die having the desired non-trivial cross-sectional shape and at least one heating section and a cooling section;

controlling the pull rate and the temperature of the heating and cooling sections of the die to gel the polymer composition during the pulling through the die so that the article will retain its non-trivial shape, said controlling being in response to (1) the viscosity and the cure kinetics of the polymer composition and (2) the non-trivial cross-sectional shape of the article;

recovering a postformable article of a fiber reinforced thermosetting polymer composition from the die; said article having a substantial length and a non-trivial uniform cross-sectional shape, and said polymer composition being sufficiently gelled so that the article will retain its non-trivial cross-sectional shape and sufficiently cool to retard further curing of the polymer for an extended period of time;

maintaining the postformable article for an extended period at a temperature below the temperature at which further curing of the polymer composition will occur;

cutting the postformable article into a finite length at some time between the time just prior to recovery and prior to postforming;

postforming the postformable article into a different shape;

heating the article to a temperature at which final and full curing of the polymer composition occurs;

and recovering an article of a fiber reinforced cured polymer composition having a finite length, a non-trivial uniform cross-sectional shape and a different postformed shape.

2. The process according to claim 1 wherein the polymerizable composition is an addition polymerizable composition.

3. The process according to claim 1 wherein the polymerizable composition is an epoxy polymerizable composition.

4. The process according to claim 3 wherein the epoxy composition is a glycidyl polyether of a polyhydric phenol.

5. The process according to claim 4 wherein the polyhydric phenol is 2,2-bis(4-hydroxyphenyl)propane.

6. The process according to claim 3 wherein the epoxy composition is a saturated epoxy resin.

7. The process according to claim 3 wherein the curing agent in the epoxy polymerizable composition is an aromatic primary amine.

8. The process according to claim 7 wherein the amine is alpha, alpha'-bis (3,5-dimethyl-4-aminophenyl-p-diisopropylbenzene, or diethyltoluenediamine.

9. The process according to any one of claims 1-7 wherein the fibers are selected from the group consisting of carbon fibers, boron fibers, ceramic fibers, glass fibers or synthetic organic fibers.

10. The process according to any one of claims 1-7 wherein the non-trivial uniform cross-sectional shape is selected from the group consisting of circular, rectangular, trapezoidal, X-shaped, T-shaped, I-shaped, J-shaped trilobal, dog bone-shaped or angular-shaped.

11. The process according to claim 10 wherein the shape is selected from circular and rectangular.

12. The process according to any one of claims 1-7 wherein the heating in the pultrusion die is conduct in at least two heating zones.

13. The process according to claim 12 wherein the heating is conducted by electrical heaters.

14. The process according to any one of claim 1-7 wherein the cooling is conducted in a single cooling zone using at least two different kinds of cooling means.

15. The process according to claim 14 wherein the cooling is by indirect air cooling means followed by indirect water cooling means.

16. The process according to any one of claim 1-7 wherein the temperature of the polymer composition is also controlled before it enters the die.

17. The process according to any one of claims 1-7 whrein the temperature in the pultrusion die is controlled by (1) determining the initial temperature, $T_1$, of the fiber-polymerizable composition mixture used to make the article at a first temperature probe location in the pultrusion die and the degree of conversion of the polymerizable composition, alpha, (2) determining the reaction rate to gel of the polymerizable composition d alpha/d time, (3) determining the temperature, $T_2$, at a second probe location in the pultrusion die, (4) determining the increment of time for the mixture to traverse a distance through the die, (5) calculating the distance the fiber-polymerized composition mixture is drawn through the die from the first location to the second location, $V_z \times$ time, and, based on the foregoing, (6) set a new die temperature at a probe location based on the distance of the probe from a prior probe location.

18. The process according to any one of claim 1-7 wherein the pull rate of the pultrusion die is controlled by (1) determining the initial temperature $T_1$, of the fiber-polymerizable composition mixture used to make the article at a first temperature probe location in the pultrusion die and the degree of conversion of the polymerizable composition, alpha, (2) determining the reaction rate to gel of the polymerizable composition d alpha/d time, (3) determining the temperature $T_2$, at a second probe location in the pultrusion die, (4) determining the increment of time, (5) calculating the distance the fiber-polymerized composition mixture is drawn through the die from the first location to the second location, $V_z \times$ time, and, based on the foregoing, (6) set a new pull rate based on the temperatures and degree of conversion of the mixture from a prior probe location.

19. The process according to any one of claim 1-7 wherein the different shape given to the postformed article is selected from twist, curve, taper, indentation, protrusion, grooving and lipping.

20. The process according to claim 19 wherein the different shape is selected from twist and taper.

21. A continuous process for the preparation of a postformable article of a fiber-reinforced thermosetting polymer having a substantial length and a non-trivial uniform cross-sectional shape conforming with the cross-sectional shape of an article having an edge portion of considerable width as compared to its thickness throughout its length, which process comprises introducing reinforcing fibers continuously into a liquid thermosetting polymerizable composition;

pulling the thermosetting composition-fiber mixture continuously through a die, said die having the desired non-trivial cross-sectional shape and at least one heating section and a cooling section;

controlling the pull rate and the temperature of the heating and cooling sections of the die to gel the thermosetting composition during said pulling so that the postformable article will retain its non-trivial cross-sectional shape for an extended period of time, said controlling being in response to (1) the viscosity and cure kinetics of the thermosetting composition and (2) the desired non-trivial uniform cross-sectional shape of the article;

recovering a postformable article of a fiber-reinforced thermosetting composition for the die, said article having the desired non-trivial uniform cross-sectional shape, and said thermosetting composition being sufficiently gelled so that the article will retain its non-trivial cross-sectional shape and sufficiently cool to retard further curing of the thermosetting composition for an extended period of time.

22. The process according to claim 21 wherein the thermosetting composition is an addition polymerizable composition.

23. The process according to claim 21 wherein the thermosetting composition is an epoxy polymerizable composition.

24. The process according to claim 23 wherein the epoxy composition is a glycidyl polyether of a polyhydric phenol.

25. The process according to claim 24 wherein the polyhydric phenol is 2,2-bis(4-hydroxyphenyl)propane.

26. The process according to claim 23 wherein the epoxy composition is a saturated epoxy resin.

27. The process according to claim 23 wherein the curing agent in the epoxy polymerizable composition is an aromatic amine.

28. The process according to claim 27 wherein the amine is alpha, alpha'-bis (3,5-dimethyl-4-aminophenyl)-p-diisopropyllbenzene, diethyltoluenediamine or mixtures thereof.

29. The process according to any one of claim 21-27 wherein the fibers are selected from the group consisting of carbon fibers, boron fibers, ceramic fibers, glass fibers and synthetic organic fibers, 30. The process according to ny one of claim 21-27 wherein the non-trivial uniform cross-sectional shape is selected from the group consisting of circular, rectangular, trapezoidal, X-shaped, T-shaped, I-shaped, J-shaped trilobal, dog bone-shaped or angular-shaped.

31. The process according to claim 30 wherein the shape is selected from circular and rectangular.

32. The process according to any one of claim 21-27 wherein the heating is conduct in at least two heating zones.

33. The process according to claim 32 wherein the heating is conducted by electrical heaters.

34. The process according to any one of claim 21-27 wherein the cooling is conducted in a single cooling zone using at least two different kinds of cooling means.

35. The process according to claim 34 wherein the cooling is by indirect air cooling means followed by indirect water cooling means.

36. The process according to any one of claim 21-27 wherein the temperature of the polymer composition is also controlled before it enters the die.

37. The process according to any one of claims 21-27 wherein the temperature is controlled by (1) determining the initial temperature, $T_1$, of the fiber-thermosetting composition mixture used to make the article at a first temperature probe location in the pultrusion die and the degree of conversion of the thermosetting composition, alpha, (2) determining the reaction rate to gel of the thermosetting composition d alpha/d time, (3) determining the temperature $T_2$, at a second probe location in the pultrusion die, (4) determining the increment of time for the mixture to traverse a distance through the die, (5) calculating the distance the fiber-thermosetting composition mixture is drawn through the die from the first location to the second location, Vz x time, and, based on the foregoing, (6) set a new die temperature at a probe location based on the distance of the probe from a prior probe location.

38. The process according to any one of claim 21-27 wherein the pull rate is controlled by (1) determining the initial temperature, $T_1$, of the fiber-thermosetting composition mixture used to make the article at a first temperature probe location in the pultrusion die and the degree of conversion of the thermosetting composition, alpha, (2) determining the reaction rate to gel of the thermosetting composition d alpha/d time, (3) determining the temperature, $T_2$, at a second probe location in the pultrusion die, (4) determining the increment of time, (5) calculating the distance the fiber-thermosetting composition mixture is drawn through the die from the first location to the second location, Vz x time, and, based on the foregoing, (6) set a new pull rate based on the temperatures and degree of conversion of the mixture from a prior probe location.

39. The process according to claim 1 wherein the postformable article is adhesively bonded or cocured to another substrate during at least one of (a) postforming to a different shape or (b) heating to full cure.

* * * * *